US012645682B2

(12) United States Patent
Faizakof et al.

(10) Patent No.: US 12,645,682 B2
(45) Date of Patent: Jun. 2, 2026

(54) SYSTEM AND METHOD FOR RETRIEVING RECORDS FROM A DATABASE

(71) Applicant: GENESYS CLOUD SERVICES, INC., Menlo Park, CA (US)

(72) Inventors: Avraham Faizakof, Tel-Aviv (IL); Rotem Maoz, Tel-Aviv (IL); Lev Haikin, Tel-Aviv (IL); Eyal Orbach, Tel-Aviv (IL); Nelly David, Tel-Aviv (IL); Rakesh Tailor, Ontario (CA); Anik Dey, Ontario (CA)

(73) Assignee: Genesys Cloud Services, Inc., Menlo Park, CA (US)

( * ) Notice: Subject to any disclaimer, the term of this patent is extended or adjusted under 35 U.S.C. 154(b) by 0 days.

(21) Appl. No.: 18/511,060

(22) Filed: Feb. 5, 2024

(65) Prior Publication Data

US 2025/0252109 A1     Aug. 7, 2025

(51) Int. Cl.
| | |
|---|---|
| *G06F 16/00* | (2019.01) |
| *G06F 16/2457* | (2019.01) |
| *G06F 16/951* | (2019.01) |
| *G06F 16/9538* | (2019.01) |

(52) U.S. Cl.
CPC ...... *G06F 16/24578* (2019.01); *G06F 16/951* (2019.01); *G06F 16/9538* (2019.01)

(58) Field of Classification Search
CPC ............. G06F 16/24578; G06F 16/951; G06F 16/9538
USPC ........................................................ 707/711
See application file for complete search history.

(56) References Cited

U.S. PATENT DOCUMENTS

| | | | | |
|---|---|---|---|---|
| 8,831,205 B1 * | 9/2014 | Wu | ..................... | H04M 3/5233 |
| | | | | 370/352 |
| 9,171,081 B2 * | 10/2015 | Ganjam | ................ | G06F 16/951 |
| 11,630,829 B1 * | 4/2023 | Thunuguntla | ..... | G06F 16/24575 |
| | | | | 707/723 |
| 2013/0238621 A1 * | 9/2013 | Ganjam | ................ | G06F 16/951 |
| | | | | 707/E17.084 |
| 2015/0286686 A1 * | 10/2015 | Boley | ................. | G06F 16/2465 |
| | | | | 707/722 |
| 2022/0405334 A1 * | 12/2022 | Rozich | ................ | G06F 16/9035 |
| 2024/0211482 A1 * | 6/2024 | Bharadwaj | ........ | G06F 16/24578 |

OTHER PUBLICATIONS

International Search Report and Written Opinion received in co-pending PCT application PCT/US2025/013485 mailed on Apr. 2, 2025.

(Continued)

*Primary Examiner* — Monica M Pyo
(74) *Attorney, Agent, or Firm* — Taft Stettinius & Hollister LLP

(57) ABSTRACT

The present invention relates generally to the technological field of search engines. More specifically, the present invention relates to detecting statistical irregularities in data and retrieving records pertaining to these irregularities. The invention represents a system and methods of retrieving records from an indexed database which provide an improvement of the technological field of search engines and information retrieval by making the detection and retrieval of records representing statistical irregularities in the database faster, more efficient, and less computationally complex.

13 Claims, 8 Drawing Sheets

(56) References Cited

OTHER PUBLICATIONS

Alessandro Bozzon et al: "Chapter 13: Liquid Queries and Liquid Results in Search Computing"Mar. 15, 2010, Sat 2015 18th International Conference, Austin, TX, USA, Sep. 24-27, 2015; [Lecture notes in computer science; Lect. Notes computer], Springer, Berlin, Heidelberg, pp. 244-267, XP019139864.

Gemmell, J et al.: "Living With a Lifetime Store", Internet Citation, Sep. 9, 2003, pp. 69-76, XP002528958, Retrieved from the internet: URL: https://www.microsoft.com/en-us/research/wp-content/uploads/22016/02/uem2003.pdf.

* cited by examiner

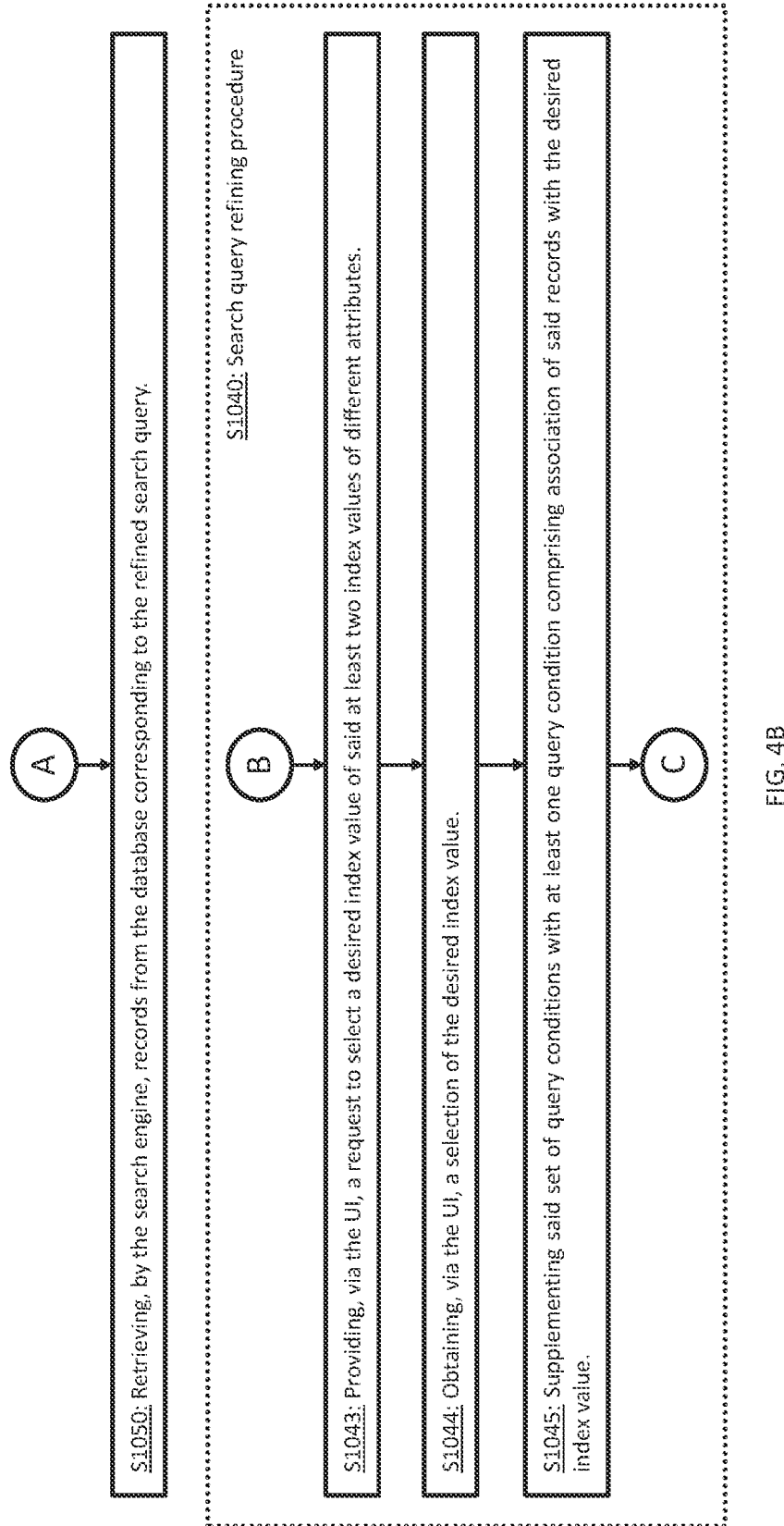

S1050: Retrieving, by the search engine, records from the database corresponding to the refined search query.

S1040: Search query refining procedure

B

S1043: Providing, via the UI, a request to select a desired index value of said at least two index values of different attributes.

S1044: Obtaining, via the UI, a selection of the desired index value.

S1045: Supplementing said set of query conditions with at least one query condition comprising association of said records with the desired index value.

C

SYSTEM AND METHOD FOR RETRIEVING RECORDS FROM A DATABASE

FIELD OF THE INVENTION

The present invention relates generally to the technological field of search engines. More specifically, the present invention relates to detecting statistical irregularities in data and retrieving records pertaining to these irregularities.

BACKGROUND OF THE INVENTION

Nowadays, various information retrieval technologies are applied ubiquitously and constitute an essential part of almost every software product.

Information retrieval (IR) in computing and information science is the process of obtaining information system resources (e.g., database records) that are relevant to an information need from a collection of those resources (e.g., form a database).

In order to find the information of interest faster, the concept of indexing has been elaborated. Index represents a database wherein each document or record is represented through a plurality of fields (or attributes) of different types, such as text, numerical, date etc. Without an index, a search engine would scan every document or record in a corpus or database, which would require considerable time and computing power. For example, while an index of thousands of documents can be queried within milliseconds, a sequential scan of every word in these documents could take hours. The additional computer storage required to store the index, as well as the considerable increase in the time required for an index update to take place, are traded off for the time saved during information retrieval.

A software tool that is configured to perform indexing, searching and retrieving information from databases is known in the art as a search engine. Although the field of search engines has expanded dramatically during last years, the vast majority of known solutions provides some kind of a generic searching tool aimed to cover a wide variety of practical applications. However, when it comes to specific demands of different, rather narrowly focused applications, known solutions turn out to be insufficiently effective.

As an example illustrating the problem, regular demands of exploring a database of contact or call center records may be considered. Contact centers engage in numerous interactions with their customers, and these interactions vary significantly in subject matters, such as complaints, required assistance, general questions and so forth. Analyzing a large number of interactions in a contact center is a challenging problem, which requires simultaneously accessing many types of data or contact reasons in a manner that provides fast and interactive results. Some solutions commonly used in the art suggest providing a user interface (UI) having lists of filters corresponding to index values and grouped by specific attribute (e.g., date, agent ID, topics, sentiment score (e.g., very negative, negative, neutral, positive, very positive etc.)). The user may also be provided with a number of database records pertaining to each index value.

The common purpose of contact center database exploration is to detect statistical irregularities in the plurality of records, e.g., to determine that a specific product has certain irregularly prevailing issues. Statistical irregularities (or statistical anomalies) represent subsets of records that outlie from what is considered a normal distribution of records in "the space" of index values. By exploring a database of months and years of records when having, as a tool, only a list of filters (index values) and a number of records pertaining to each filter, it is almost impossible to detect such irregularities.

Furthermore, existing approaches to content exploration usually explore the free (unstructured) text using a two-step procedure including document (or record) clustering and key-phrase extraction, where depending on the implementation, the order can change. Typically, this procedure, due to its computational complexity, is performed offline, which means that the records are processed periodically in batches (e.g., once a day), and the updated results may be provided to the user only after the processing is done.

Hence, applying known-in-the-art techniques to explore databases for the purpose of detecting statistical irregularities is not only ineffective, but also cannot be performed as an online ongoing process.

SUMMARY OF THE INVENTION

Accordingly, there is a need for a system and method of retrieving records from an indexed database which would provide an improvement of the technological field of search engines and information retrieval by making the detection and retrieval of records representing statistical irregularities in the database faster, more efficient, and less computationally complex.

In the general aspect, the invention may be directed to a first method of retrieving records from a database, by at least one processor. The first method may include providing a search query to a search engine configured to retrieve records from a database storing said records indexed by at least one attribute, wherein the search query is defined by a set of query conditions; iteratively performing, by the search engine, a search query refining procedure until a break condition is satisfied. Said search query refining procedure may include: (i) calculating for each index value of the at least one attribute, a significance score value S determined as:

$$S = \frac{N_{xy}/N_x}{N_y/N_t},$$

wherein $N_{xy}$ represents a number of records corresponding to said set of query conditions and associated with a respective index value, $N_x$ represents a total number of records corresponding to said set of query conditions, $N_y$ represents a total number of records associated with the respective index value, and $N_t$ represents a total number of records in the database; and (ii) supplementing said set of query conditions with at least one query condition comprising association of said records with at least one index value having the significance score value higher than a first predefined threshold, thereby refining the search query. Said break condition may be satisfied when, for the records corresponding to the supplemented set of query conditions, there is no index values having the significance score value higher than the first predefined threshold. The first method may further include retrieving, by the search engine, records from the database corresponding to the refined search query.

In another general aspect, the invention may be directed to a second method of retrieving records from a database, by at least one processor. The second method may include providing, via a user interface (UI), an initial search query to a search engine configured to retrieve records from the database storing said records indexed by at least one attribute, wherein the initial search query is defined by at least one first query condition; calculating, by the search engine, for each index value of the at least one attribute, a significance score value S determined according to the equation above, wherein $N_{xy}$ represents a number of records corresponding to said at least one first query condition and associated with a respective index value, $N_x$ represents a total number of records corresponding to said at least one first query condition, $N_y$ represents a total number of records associated with the respective index value, and $N_t$ represents a total number of records in the database. The second method may further include providing, via the UI, a sorted list of index values of the at least one attribute, said sorted list being sorted by the significance score; receiving, via the UI, a refined search query defined by (i) said at least one first query condition and (ii) at least one second query condition, comprising association of said records with at least one index value from the sorted list; and retrieving, by the search engine, records from the database corresponding to the refined search query.

In yet another general aspect, the invention may be directed to a system for retrieving records from a database. In some embodiments, the system may include: at least one non-transitory memory device, wherein modules of instruction code are stored, and at least one processor associated with said at least one memory device, and configured to execute the modules of instruction code, whereupon execution of said modules of instruction code, the at least one processor is configured to: provide a search query to a search engine configured to retrieve records from the database storing said records indexed by at least one attribute, wherein the search query is defined by a set of query conditions; iteratively perform, by the search engine, a search query refining procedure until a break condition is satisfied, said search query refining procedure including: (i) calculating for each index value of the at least one attribute, a significance score value S determined according to the equation above, wherein $N_{xy}$ represents a number of records corresponding to said set of query conditions and associated with a respective index value, $N_x$ represents a total number of records corresponding to said set of query conditions, $N_y$ represents a total number of records associated with the respective index value, and $N_t$ represents a total number of records in the database; and (ii) supplementing said set of query conditions with at least one query condition comprising association of said records with at least one index value having the significance score value higher than a first predefined threshold, thereby refining the search query, wherein said break condition is satisfied when, for the records corresponding to the supplemented set of query conditions, there is no index values having the significance score value higher than the first predefined threshold. The at least one processor may be further configured to retrieve, by the search engine, records from the database corresponding to the refined search query.

In some embodiments, the first and second method may further include providing the list of the retrieved records via the UI.

In some embodiments, providing the search query to the search engine may be performed via a user interface (UI).

In some embodiments, the first method may further include providing, via the UI, a list of index values of the at least one attribute; wherein providing the search query to the search engine may include obtaining, via the UI, selection of at least one index value from the list; and wherein said set of query conditions may include a query condition comprising an association of said records with the selected at least one index value.

In some embodiments of the first method, set of query conditions may include at least one of: (i) a query condition indicating at least one specific keyword to be found in said records; (ii) a query condition including an association of said records with at least one specific index value.

In some embodiments of the first method, said search query refining procedure may further include, when at least two index values of different attributes have (i) the significance score values higher than the first predefined threshold; and (ii) an absolute value of a difference between the significance score values lower than a second predefined threshold, providing, via the UI, a request to select a desired index value of said at least two index values of different attributes; obtaining, via the UI, a selection of the desired index value; and supplementing said set of query conditions with at least one query condition comprising association of said records with the desired index value.

In some embodiments, the first method may further include setting at least one of the first predefined threshold and the second predefined threshold via the UI.

In some embodiments, said at least one first query condition may include an indication of at least one specific keyword to be found in said records.

In some embodiments, the second method may further include providing, via the UI, an initial list of index values of the at least one attribute, wherein said at least one first query condition comprises an association of said records with said at least one index value from the initial list.

In some embodiments of the second method, said sorted list being sorted by a significance score in an ascending or descending order.

In some embodiments, the second method may further include setting a predefined threshold via the UI. Said sorted list may consist of the indexed values having the significance score value higher or lower than the predefined threshold.

In some embodiments of the second method, said sorted list may consist of the indexed values having the significance score value higher than a first predefined threshold and lower than a second predefined threshold.

In some embodiments of the system, the at least one processor is further configured to provide the search query to the search engine via a user interface (UI).

In some embodiments of the system, the at least one processor is further configured to provide the list of the retrieved records via the UI.

In some embodiments of the system, the at least one processor is further configured to: provide, via the UI, a list of index values of the at least one attribute; and provide the search query to the search engine by obtaining, via the UI, selection of at least one index value from the list; wherein said set of query conditions includes a query condition including an association of said records with the selected at least one index value.

In some embodiments of the system, said set of query conditions includes at least one of: (i) a query condition indicating at least one specific keyword to be found in said records; (ii) a query condition comprising an association of said records with at least one specific index value.

In some embodiments of the system, said search query refining procedure further includes, when at least two index values of different attributes have (i) the significance score values higher than the first predefined threshold; and (ii) an absolute value of a difference between the significance score values lower than a second predefined threshold, providing, via the UI, a request to select a desired index value of said at least two index values of different attributes; obtaining, via the UI, a selection of the desired index value; and supplementing said set of query conditions with at least one query condition comprising association of said records with the desired index value.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4B is the second part of the flow diagram, depicting a method for retrieving records from a database, according to some embodiments.

Figure 1A:
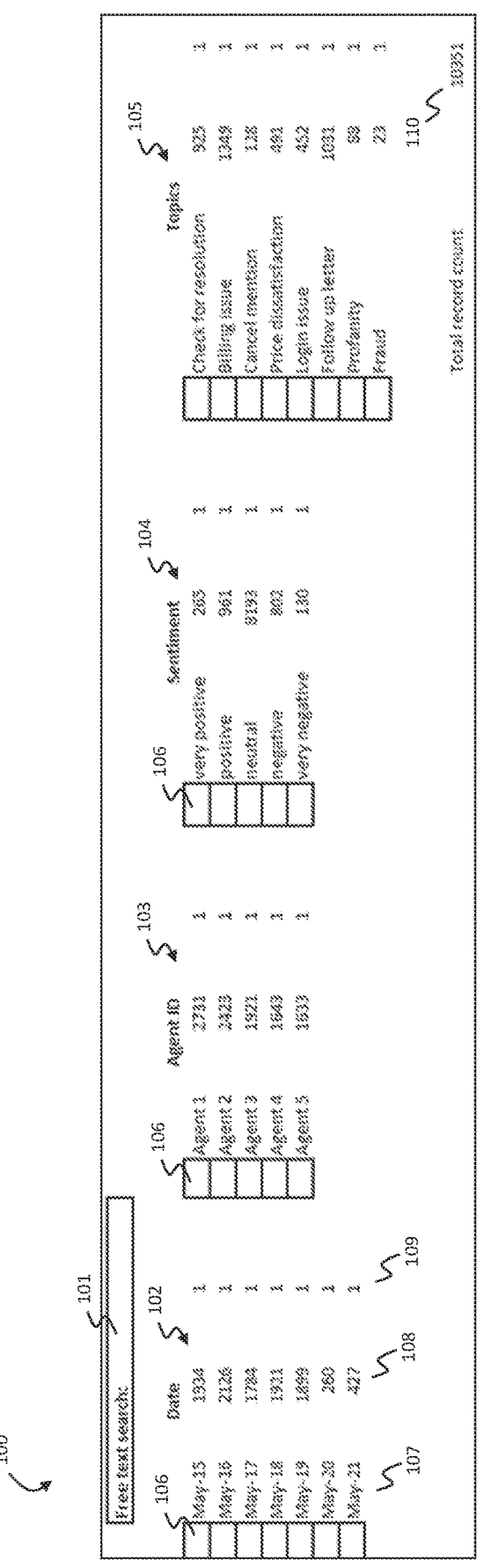
FIG. 1A is an illustration of an example of UI provided by a system for retrieving records from a database, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "choosing", "selecting", "omitting", "training" or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

It shall also be understood that, in the context of the present invention, the terms "filter" and "attribute" refer to a specific index category, obtained in result of indexing the database.

It shall also be understood that, in the context of the present invention, the terms "index value" and "filter value" refer to a particular value of the index category, obtained in result of indexing the database.

Unless explicitly stated, the method embodiments described herein are not constrained to a particular order or sequence. Additionally, some of the described method embodiments or elements thereof can occur or be performed simultaneously, at the same point in time, concurrently, or iteratively and repeatedly.

In embodiments of the present invention, some steps of the claimed method may be performed using machine-learning (ML)-based models or may include actions performed on ML-based models. ML-based models may be configured or "trained" for a specific task, e.g., classification or regression.

In some embodiments, ML-based models may be artificial neural networks (ANN).

A neural network (NN) or an artificial neural network (ANN), e.g., a neural network implementing a machine learning (ML) or artificial intelligence (AI) function, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

It should be obvious for the one ordinarily skilled in the art that various ML-based models can be implemented without departing from the essence of the present invention. It should also be understood, that in some embodiments ML-based model may be a single ML-based model or a set (ensemble) of ML-based models realizing as a whole the same function as a single one. Hence, in view of the scope of the present invention, the abovementioned variants should be considered equivalent.

As mentioned above, to facilitate database exploration for the purposes of statistical irregularities detection, the known solutions suggest providing, via UI, a list of index values grouped by attributes, which a user can choose to filter database records accordingly. Index values may be accompanied by a record count parameter, representing a number of records associated with each index value. Obviously, this information gives zero knowledge about statistical irregularities (or, in other words, records that represent an "outlier" or an "outlying category" if compared to the distribution of other records within an index-value space) to the user, thereby making database exploration for the purpose of detecting such irregularities ineffective and slow.

The present invention, in turn, provides a database exploration instrument, which performs specific automatic actions that facilitate and accelerate the detection of database records pertaining to statistical irregularities. The core of the invention may be considered lying in the calculation of "the significance score"—a statistical metric, representing an extent of "anomalousness" of a record selection associated with a specific index value or combination thereof. In the provided methods and system, the significance score is used, for example, to: (i) sort a list of index values so as to provide the ones pertaining to statistical irregularities on top of the list, thereby helping the user to find and select the index values of interest faster, and, thus, to retrieve the desired records selection faster; (ii) provide to the user only those index values that pertain to statistical irregularities, thereby avoiding occurrence of any irrelevant selection; and (iii) select the index value of interest for the user, e.g., completely automatically. Therefore, the abovementioned improvement of search engine and data retrieval technical field may be achieved.

Furthermore, as mentioned above, in a standard exploration system, a two-step approach of key-phrase extraction and clustering is used. The nature of these systems is that the key-phrase extraction is performed as a pre-processing step, that can be done once a record (e.g., a voice transcription of a particular call center request) is made, while the clustering process, due to its computational complexity, is periodic and done once a set of records is processed (e.g., once a day).

In the present invention, in order to calculate the significance score for each index value, only a simple mapping structure between index values and records that pertain thereto is needed. Significance score calculation, as well as the performance of the abovementioned actions based thereon, represent a computationally trivial process that can be easily done "on the fly" (e.g., each time the new query condition is added). Furthermore, no clustering is required for the purposes of statistical irregularities detection. Accordingly, the present invention further contributes to the abovementioned technological improvement, by reducing computational complexity of the process of statistical irregularities detection.

The concept of the present invention, as well as the technological improvement, are further illustrated and explained with reference to FIGS. 1A-1C.

Figure 1B:
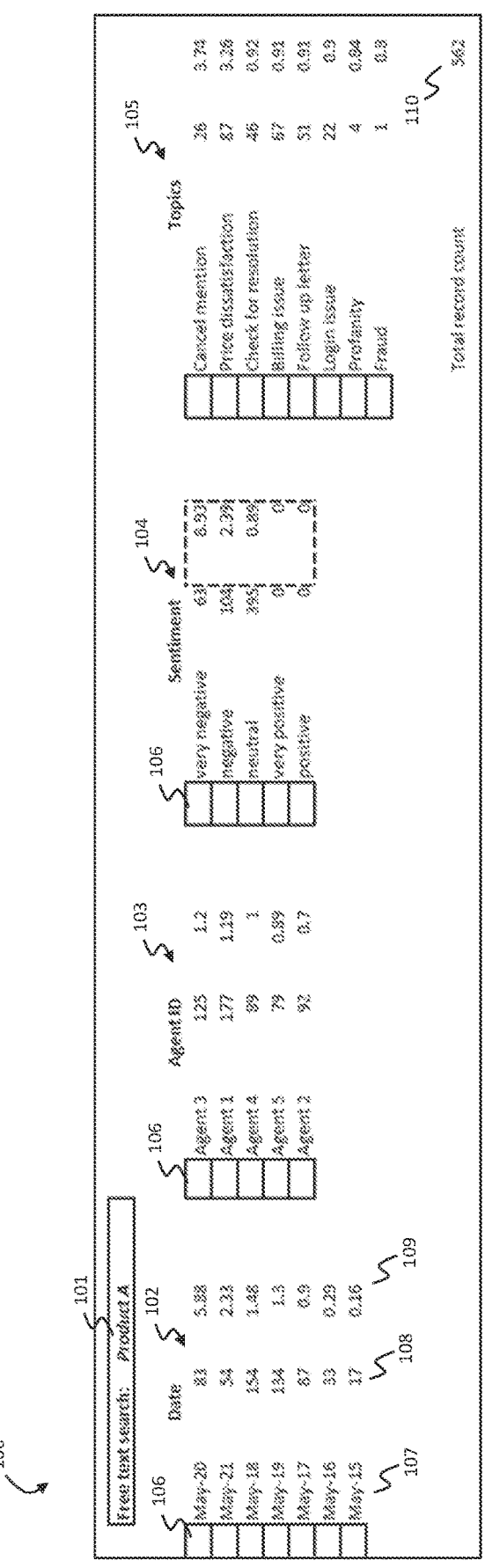
FIG. 1B is another illustration of the example of UI provided by the system for retrieving records from a database, according to some embodiments.
Figure 1C:
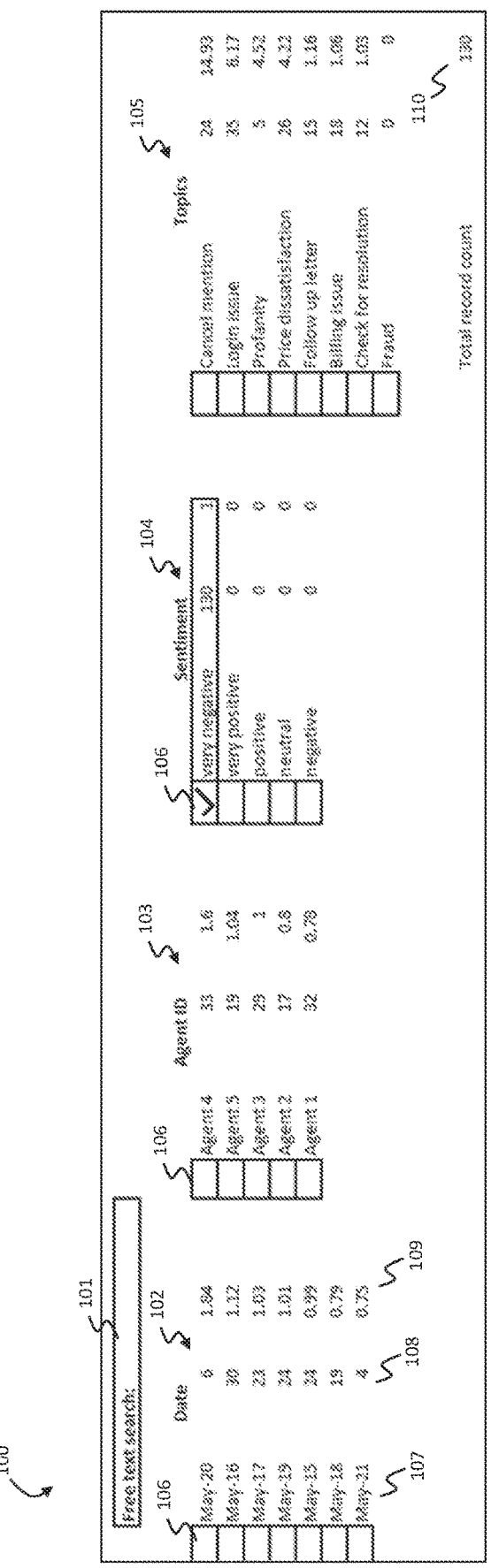
FIG. 1C is yet another illustration of the example of UI provided by the system for retrieving records from a database, according to some embodiments.

Reference is now made to FIGS. 1A-1C, which depict an example of UI provided by the system for retrieving records from a database, according to some embodiments.

In the present disclosure, embodiments of the invention are mostly illustrated with a reference to a call center database. Such a reference is provided exclusively for the purpose of clarity and shall not be considered in any respect limiting the scope of the present invention which is defined by the appended set of claims.

As shown in FIG. 1A, the UI of the system may include initial search request generating screen 100 which may be provided, e.g., via a web interface.

In some embodiments, initial search request generating screen 100 may include free text search field 101, designated for entering a specific keyword to be found in database records.

Initial search request generating screen 100 may further include lists 102, 103, 104 and 105 of index values 107 (e.g., "May-15", "Agent 2", "Very positive", "Price dissatisfaction" etc.) grouped by respective attribute (e.g., "Date", "Agent ID", "Sentiment" and "Topics"). Each index value 107 may be accompanied with: (i) checkbox element 106 for receiving, from the user, a selection of the desired index value 107 (which will lead to forming a query condition representing an association of the records with respective index value 107); (ii) a record count 108, representing a number of records pertaining to each specific index value 107; and (iii) significance score value S 109 which may be calculated as described above. Additionally, screen 100 may include total record count 110, indicating the total number of records in the current selection.

As can be seen in FIG. 1A, in the initially provided list of index values 107, each index value has equal significance score 109, since no search query is yet provided.

In some embodiments, the first query condition may be provided by the user, to give the system an initial "direction" in which data exploration shall be proceeded.

In some alternative embodiments, the first query condition may be received from some other software module, responsible for such selection. Furthermore, the first query conditions may be preset in advance and, e.g., the search may be applied periodically (e.g., each midnight) in an automatic manner. Such a preset first query conditions may, for example, include: (i) an indication, in free text search field 101, of all product names that appear more than 50 times in the day that is ending; (ii) an association of records with index values 107 of "Topics" attribute that occur more than 50 times in the last day; (iii) an association of records with index values 107 "negative" and "very negative" etc. As can be seen, total record count 110 in the database (when no query condition is provided) equals 10351.

As can be seen in FIG. 1B, once the user provides a query condition via filed 101—a keyword "Product A" to be found in the records, the system for retrieving records from the database automatically recalculates record counts 108 and 110 and significance score values 109. The system further provides screen 100' showing lists 102, 103, 104 and 105 sorted by significance score 109, e.g., in the descending order (e.g., as indicated by a dash line). Thereby, the user receives index values 107 that represent the most statistically irregular records on top of the list, which obviously facilitates and accelerates the following selection. In this case, the most reasonable next step would be to select index value "very negative".

In the represented stage of the database exploration, the technological improvement provided by the invention may be already seen. If there were no significance score 109 information and no sorting by significance score 109, the user would be only provided with record count 108 information. This information would, e.g., show the user that, if consider "Sentiment" attribute, 63 records are associated with index value 107 "very negative", 104 records are associated with index value 107 "negative" and 395 records are associated with index value 107 "neutral". Based on this information, it may be even concluded that having 63 "very negative" records compared to 395 "neutral" ones is normal and no further exploration is needed. However, in fact, having only record count information is not enough to make a correct judgement on statistical irregularities.

In order to make a correct judgement, the additional parameter shall be considered—a ratio of a total number of records associated with the respective index value (e.g., "very negative", "negative" or "neutral") to a total number of records in the database (e.g., 10351, according to the provided example). Significance score 109, as described herein, represents an evaluation of this parameter. In particular, significance score 109 is provided in order to normalize the ratio of (i) a number of records corresponding to the set of query conditions (in this example—keyword "Product A") and associated with a respective index value 107 (e.g., "very negative"), to (ii) a total number of records corresponding to said set of query conditions (in this example, the total number equals 562), by the abovementioned ratio of (i) a total number of records associated with the respective index value (e.g., "very negative", "negative" or "neutral") to (ii) a total number of records in the database (e.g., 10351 according to the provided example).

As can be seen in the provided example, significance score 109 for "very negative" index value 107 equals 8.93, for "negative"–2.39 and for "neutral"–0.89. In other words, it means that "very negative" sentiment is 8.93 times more likely to happen in interactions (database records) containing keyword "Product A" compared to any other random "very negative" interactions. Thereby, it can be clearly seen that "Product A" keyword together with "very negative" index value 107 represents an outlier (a statistical irregularity) for the explored database, and therefore should be studied more carefully.

Accordingly, by automatically performing actions based on the calculated significance score 109 (such as: sorting lists 102-105 by significance score 109, showing only those indexed values that have significance score 109 value higher than a predefined threshold; or supplementing the set of query conditions with a query condition comprising association of records with index values having significance score 109 value higher than a predefined threshold) may contribute to the abovementioned technological improvement.

In FIG. 1C, another way of providing a query condition is represented—by selecting a desired index value 107 from lists 102, 103, 104 and 105 and thereby providing a query condition comprising an association of the records with the selected index value 107.

As can be seen in FIG. 1C, once the user selects "very negative" index value 107 (e.g., via respective checkbox element 106), the system for retrieving records from the database automatically recalculates record counts 108 and 110 and significance score values 109. The system further provides lists 102, 103, 104 and 105 sorted by significance score 109, e.g., in the descending order (same as discussed with reference to screen 100' shown in FIG. 1B).

By receiving the information shown in screen 100", the user can conclude the following: (i) "Cancel mention" is highly likely to occur in "very negative" interactions (stored as database records); (ii) too many "very negative" interactions are also correlated with "Login issue": "Login issue" is 6.17 times more likely to occur in "very negative" interactions; (iii) Agent 4 is associated with "very negative" interactions too often; (iv) too many "very negative" interactions account for May 20.

As can be seen, it would be extremely hard (or it would require complex computations, like ML-based clustering) to come out with such conclusions and, thereby, to detect and retrieve records pertaining to statistical irregularities without calculating significance score 109 and further applying as described above (e.g., for sorting lists 102, 103, 104 and 105, changing their content, or performing automatic selection of index values 107 of interest).

It shall be further understood that the indicated problem of the prior art, on the one hand, and the value of the benefits of the suggested solution, on the other hand, increase dramatically with a growth of the number of records, attributes, and index values.

It shall be understood that an incorporation of specific methods of indexing (assigning index values to records) falls beyond the scope of the present invention, and the present invention is not limited in this regard. Therefore, any known techniques may be applied thereto, e.g., "Sentiment" attribute may be determined based on various natural language processing (NLP) machine-learning (ML)-based techniques by analyzing recorded conversations between customers and agents.

Figure 2:
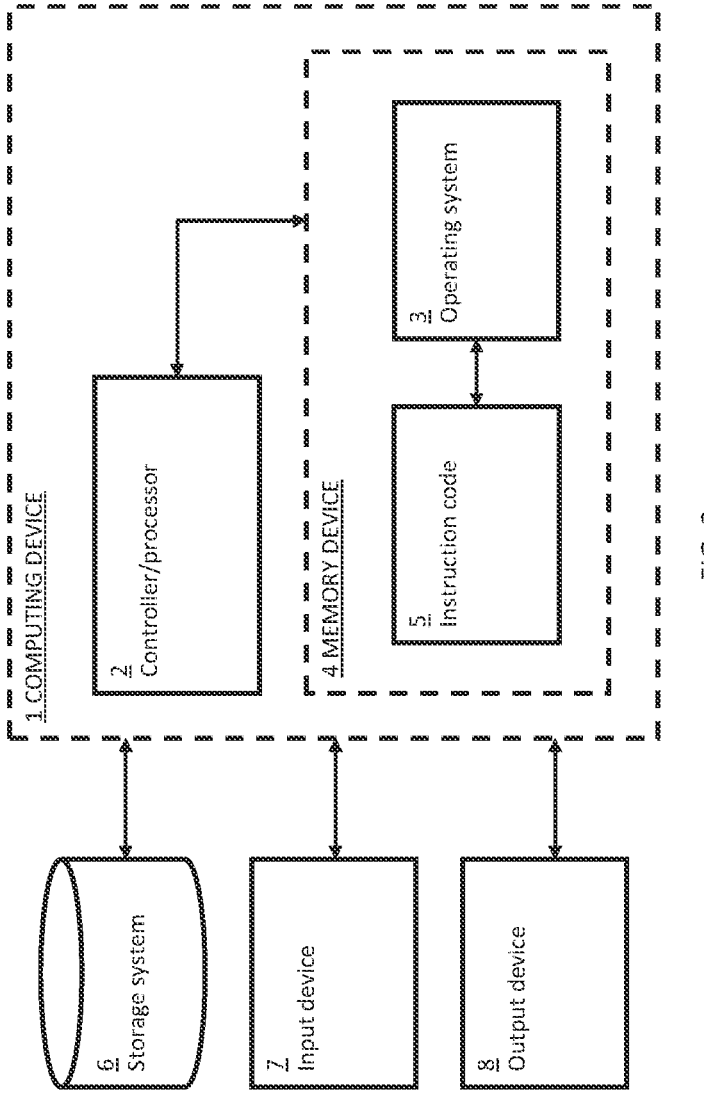
FIG. 2 is a block diagram, depicting a computing device which may be included in the system for retrieving records from a database, according to some embodiments.

Reference is now made to FIG. 2, which is a block diagram depicting a computing device, which may be included within an embodiment of the system for retrieving records from a database, according to some embodiments.

Computing device 1 may include a processor or controller 2 that may be, for example, a central processing unit (CPU) processor, a chip or any suitable computing or computational device, an operating system 3, a memory device 4, instruction code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to instruction code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory device 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory device 4 may be or may include a plurality of possibly different memory units. Memory device 4 may be a computer or processor non-transitory readable medium, or a computer non-transitory storage medium, e.g., a RAM. In one embodiment, a non-transitory storage medium such as memory device 4, a hard disk drive, another storage device, etc. may store instructions or code which when executed by a processor may cause the processor to carry out methods as described herein.

Instruction code 5 may be any executable code, e.g., an application, a program, a process, task, or script. Instruction code 5 may be executed by processor or controller 2 possibly under control of operating system 3. For example, instruction code 5 may be a standalone application or an API module that may be configured to iteratively perform, by the search engine, a search query refining procedure, as further described herein. Although, for the sake of clarity, a single item of instruction code 5 is shown in FIG. 1, a system according to some embodiments of the invention may include a plurality of executable code segments or modules similar to instruction code 5 that may be loaded into memory device 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Various types of input and output data may be stored in storage system 6 and may be loaded from storage system 6 into memory device 4 where it may be processed by processor or controller 2. In some embodiments, some of the components shown in FIG. 2 may be omitted. For example, memory device 4 may be a non-volatile memory having the storage capacity of storage system 6. Accordingly, although shown as a separate component, storage system 6 may be embedded or included in memory device 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 3A:
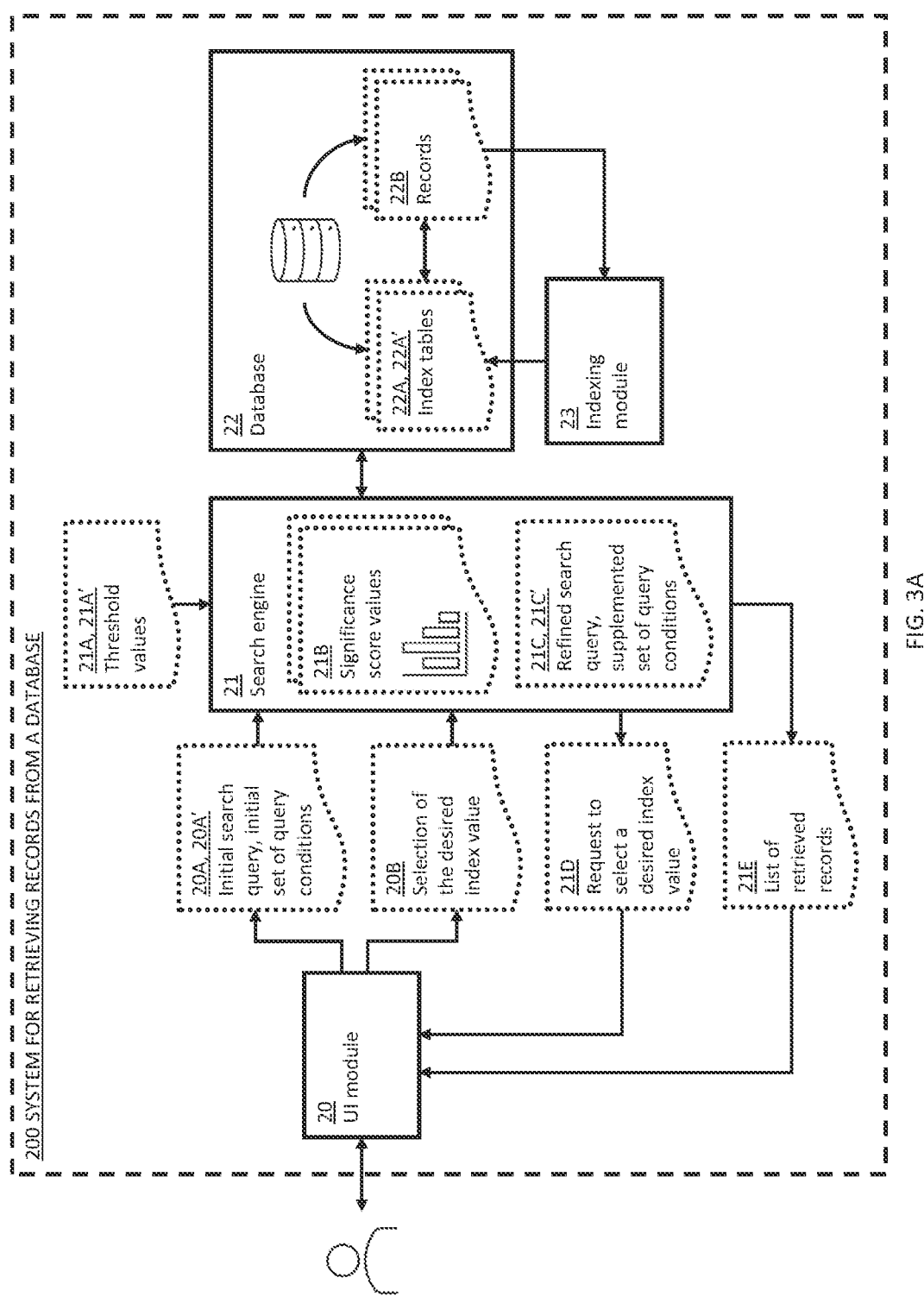
FIG. 3A is a block diagram, depicting the system for retrieving records from a database, according to some embodiments.
Figure 3B:
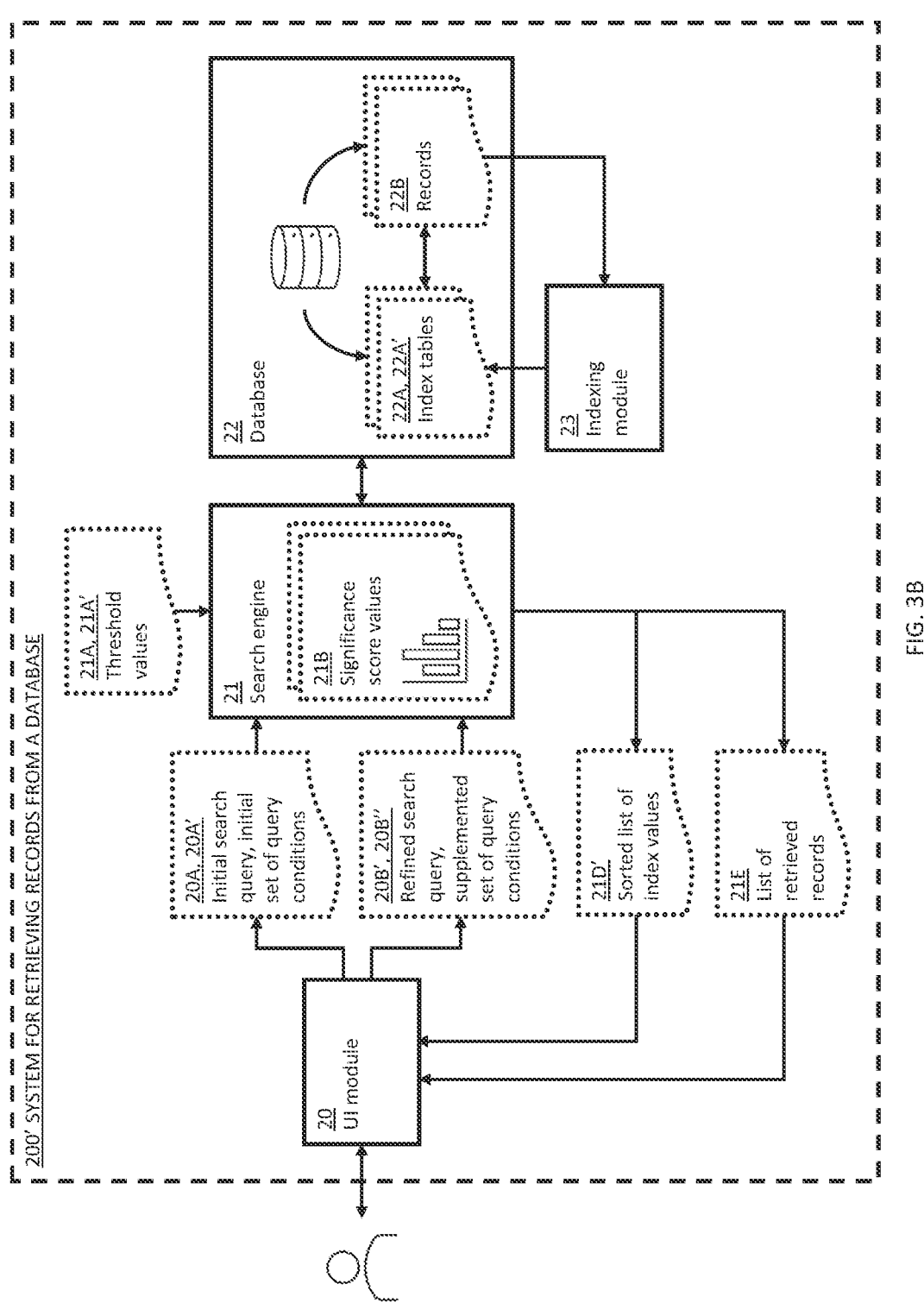
FIG. 3B is a block diagram, depicting the system for retrieving records from a database, according to other embodiments.

Reference is now made to FIGS. 3A and 3B, depicting system 200 for retrieving records from a database, according to some embodiments.

According to some embodiments of the invention, system 200 may be implemented as a software module, a hardware module, or any combination thereof. For example, system

200 may be or may include computing devices such as element 1 of FIG. 2. Furthermore, system 200 may be adapted to execute one or more modules of instruction code (e.g., element 5 of FIG. 2) to request, receive, analyze, calculate and produce various data.

As further described in detail herein, system 200 may be adapted to execute one or more modules of instruction code (e.g., element 5 of FIG. 2) in order to perform steps of the claimed method.

As shown in FIGS. 3A and 3B, arrows may represent flow of one or more data elements to and from system 200 and/or among modules or elements of system 200. Some arrows have been omitted in FIGS. 3A and 3B for the purpose of clarity.

Referring now to FIG. 3A, the content of system 200 is described below, according to some embodiments.

In some embodiments, system 200 may include user interface (UI) module 20, search engine 21 and database 22.

Database 22 may store records 22B indexed by a plurality of attributes. Database 22 may further store index tables 22A of index values 22A' (e.g., same as index values 107 shown in FIGS. 1A-1C) in association with records 22B. Search engine 21 may be configured to retrieve records 22B from database 22.

In some embodiments, system 200 may further include indexing module 23.

Indexing module 23 may be configured to receive new records 22B as they recorded to database 22 and generate associations between new records 22B and stored index values 22A' (or generate new index values 22A' when needed).

It should be understood that, in the context of present invention, term "indexing" refers to a well-known procedure, and it will be clear for the person skilled in the art which techniques should be applied to perform indexing of database 22.

UI module 20 may be configured to provide, via the UI, lists of index values 22A' (e.g., same as lists 102, 103, 104 and 105 of index values 107, as shown in FIGS. 1A-1C) of various attributes (e.g., "Date", "Agent ID", "Sentiment" and "Topics" as shown in FIGS. 1A-1C).

UI module 20 may be further configured to provide initial search query 20A to search engine 21. Search query 20A may be defined by initial set 20A' of query conditions.

In particular, UI module 20 may be configured to obtain, from the user via the UI, a selection of index values 22A' from the lists, or an indication of specific keywords to be found in records 22A (e.g., via free text search field 101, as shown in FIGS. 1A-1C). UI module 20 may further form set 20A' of query conditions, including association of records 22B with selected, by the user, index values 22A'; and/or the indication of specific keywords to be found in records 22A.

Search engine 21 may be further configured to iteratively perform a search query refining procedure until a break condition is satisfied. Said search query refining procedure may include: (i) calculating for each index value 22A' of the at least one attribute, a significance score value(S) 21B (same as significance score values 109 shown in FIGS. 1A-1C) determined as:

$$S = \frac{N_{xy}/N_x}{N_y/N_t},$$

wherein $N_{xy}$ represents a number of records 22B corresponding to set 20A' of query conditions and associated with respective index value 22A', $N_x$ represents a total number of records 22B corresponding to set 20A' of query conditions, $N_y$ represents a total number of records 22B associated with respective index value 22A', and $N_t$ represents a total number of records 22B in database 22; and (ii) supplementing set 20A' of query conditions with at least one query condition comprising association of records 22B with at least one index value 22A' having significance score value 21B higher than first predefined threshold 21A, thereby refining initial search query 20A.

Search engine 21 may be further configured to stop the search query refining procedure when the following break condition is satisfied: for records 22B corresponding to supplemented set 21C' of query conditions, there is no index values 22A' having significance score value 21B higher than first predefined threshold 21A.

In some embodiments, the break condition may additionally include the following condition: the total number of records 22B corresponding to supplemented set 21C' of query conditions (i.e., the number $N_x$) is lower than a predefined minimal record count threshold. In such embodiments, the invention further contributes to the abovementioned technological improvement by mitigating cases of false determination of statistical irregularities (in other words, by increasing resistance of system 200 to a "noise" information), since the lower the total number of records 22B corresponding to set 20A' of query conditions—the higher the probability of obtaining a false determination of an irregularity (the higher the sensitivity to the "noise" information).

In some cases, upon performing the search query refining procedure, the situation may occur, when at least two index values 22A' of different attributes have high significance score (above first predefined threshold 21A) which are equal or almost equal to each other (the difference between their significance scores is below second predefined threshold 21A'). In such cases, system 200 may forward the decision of choosing between these at least two index values 22B to the user.

Accordingly, in some embodiments, upon performing the search query refining procedure, search engine 21 may be further configured to perform the following. When at least two index values 22A' of different attributes (e.g., "Topics" and "Date") have (i) significance score values 21B higher than first predefined threshold 21A; and (ii) an absolute value of a difference between significance score values 21B lower than second predefined threshold 21A', providing, via the UI of the UI module 20, request 21D to the user to select desired index value 22A' of these at least two index values 22A' of different attributes. UI module 20 may be further configured to obtain, via the UI, selection 20B of desired index value 22A' made by the user via the UI and transfer it to search engine 21. Search engine 21 may be further configured to supplement set 20A' of query conditions with at least one query condition comprising an association of records 22B with desired index value 22A', thereby forming supplemented set 21C' of query conditions.

In some embodiments, system 200 may be further configured to provide, via the UI, values of first and second predefined thresholds 21A and 21A'. UI module 20 may be further configured to perform setting of first and second predefined thresholds 21A and 21A' via the UI, according to user's preferences. Thereby, "the sensitivity" of system 200 in terms of how high significance score value 21B must be to be considered as indicating statistical irregularity, as well as "the sensitivity" in terms of how large the absolute difference between significance score values 21B must be to ask the user to perform selection 20B, may be adjusted. Thereby, system 200 provides a flexible tool for detecting statistical irregularities, thus further facilitating and making more efficient data exploration and retrieval.

It should be understood that, depending on the terminology used, significance score value 21B may be represented differently, while keeping the same meaning. For example, in some embodiments, significance score value 21B may be determined as $$S = \frac{DF(\text{event, current filter})}{DF(\text{event, entire index})},$$

wherein DF (event, current filter) is a "document frequency" representing how frequently an event (e.g., case of the document (e.g., record 22B) being associated with respective index value 22A') occurs in the current filter (e.g., defined by set 20A' of query conditions); and DF (event, entire index) is a "document frequency" representing how frequently an event (e.g., case of the document (e.g., record 22B) being associated with respective index value 22A') occurs in the entire index (e.g., entire database 22).

In some embodiments, search engine 21 may be further configured to retrieve records 22B from database 22 corresponding to the refined search query 21C, and transfer list 21E of retrieved records 22B to UI module 20.

In some embodiments, UI module 20 may be further configured to provide list 21E of the retrieved records via the UI to the user.

Referring now to FIG. 3B, the content of system 200' is described below, according to some embodiments.

The embodiments shown in FIGS. 3A and 3B are similar in many respects. Similar elements of system 200 and 200' are indicated with same reference numbers and their description is not repeated for the sake of conciseness and clarity.

Unlike system 200 of FIG. 3A, system 200' of FIG. 3B is not configured to supplement set 20A (or 21C') of query conditions automatically. System 200' facilitates data exploration by providing, to the user, list of index values 22A' each time the new search query condition is added, wherein said list is adjusted (e.g., sorted or shortened) based on calculated significance score values 21B. The decision on which index values 22A' to select and, hence, which query conditions to add is made by the user.

In some embodiments of system 200', UI module 20 may be configured to provide, via the UI, initial lists of index values 22A' (e.g., same as lists 102, 103, 104 and 105 of index values 107, as shown in FIGS. 1A-1C) of various attributes (e.g., "Date", "Agent ID", "Sentiment" and "Topics" as shown in FIGS. 1A-1C).

UI module 20 may be further configured to provide initial search query 20A to search engine 21. Search query 20A may be defined by initial set 20A' of query conditions.

In particular, UI module 20 may be configured to obtain, from the user via the UI, a selection of index values 22A' from the initial lists, or an indication of specific keywords to be found in records 22A (e.g., via free text search field 101, as shown in FIGS. 1A-1C). UI module 20 may further form initial set 20A' of query conditions, consisting of first query conditions including association of records 22B with selected, by the user, index values 22A'; and/or the indication of specific keywords to be found in records 22A.

Search engine 21 may be further configured to calculate for each index value 22A' of the at least one attribute, a significance score value(S) 21B (same as significance score values 109 shown in FIGS. 1A-1C) determined as:

$$S = \frac{N_{xy}/N_x}{N_y/N_t},$$

wherein $N_{xy}$ represents a number of records 22B corresponding to the first query conditions and associated with respective index value 22A', $N_x$ represents a total number of records 22B corresponding to the first query conditions, $N_y$ represents a total number of records 22B associated with respective index value 22A', and $N_t$ represents a total number of records 22B in database 22.

In some embodiments, search engine 21 may be further configured to transfer to UI module 20 sorted list 21D' of index values 22A' (e.g., grouped by attributes, as shown in FIGS. 1A-1C), wherein list 21D' is sorted by significance score values 21B. UI module 20 may be further configured to provide, to the user via the UI, sorted list 21D' (e.g., same as discussed with reference to FIGS. 1A-1C). E.g., list 21D' may be sorted by significance score values 21B in an ascending or descending order.

In some embodiments, system 200 may be further configured to provide, via the UI, values of first and second predefined thresholds 21A and 21A'. UI module 20 may be further configured to perform setting of first and second predefined thresholds 21A and 21A' via the UI. In some embodiments, search engine 21 may be further configured to form list 21D' exclusively from index values 22A' having significance score values 21B higher than first predefined threshold 21A. Hence, the user may be provided with sorted list 21D' consisting of index values 22A' having significance score values 21B higher than first predefined threshold 21A.

In some alternative embodiments, search engine 21 may be further configured to form list 21D' of index values 22A' having significance score value 21B higher than first predefined threshold 21A, and lower than second predefined threshold 21A'. In such cases, second predefined threshold 21A' may be set comparatively low, so that, in result of the query, the user will be provided with list 21D' having only index values with very high significance score value 21B and with very low significance score value 21B. Hence, the user may easily understand what kind of records 22B account for statistically normal data distribution and what kind of records 22B account for statistically irregular data distribution. Thus, for the user, it may be easier to decide in which direction the data exploration should be proceeded and, accordingly, how to refine initial search query 20A.

UI module 20 may be further configured to obtain, via the UI, refined search query 20B' defined by supplemented set 20B" of query conditions including (i) the first query conditions (same as was used in initial set 20A' of query conditions) and (ii) second query conditions, including association of records 22B with at least one index value 22A' from sorted list 21D'. UI module 20 may be further configured to transfer refined search query 20B' to search engine 21.

In some embodiments, search engine 21 may be further configured to retrieve records 22B from database 22 corresponding to the refined search query 20B', and transfer list 21E of retrieved records 22B to UI module 20.

In some embodiments, UI module 20 may be further configured to provide list 21E of the retrieved records via the UI to the user.

Figure 4A:
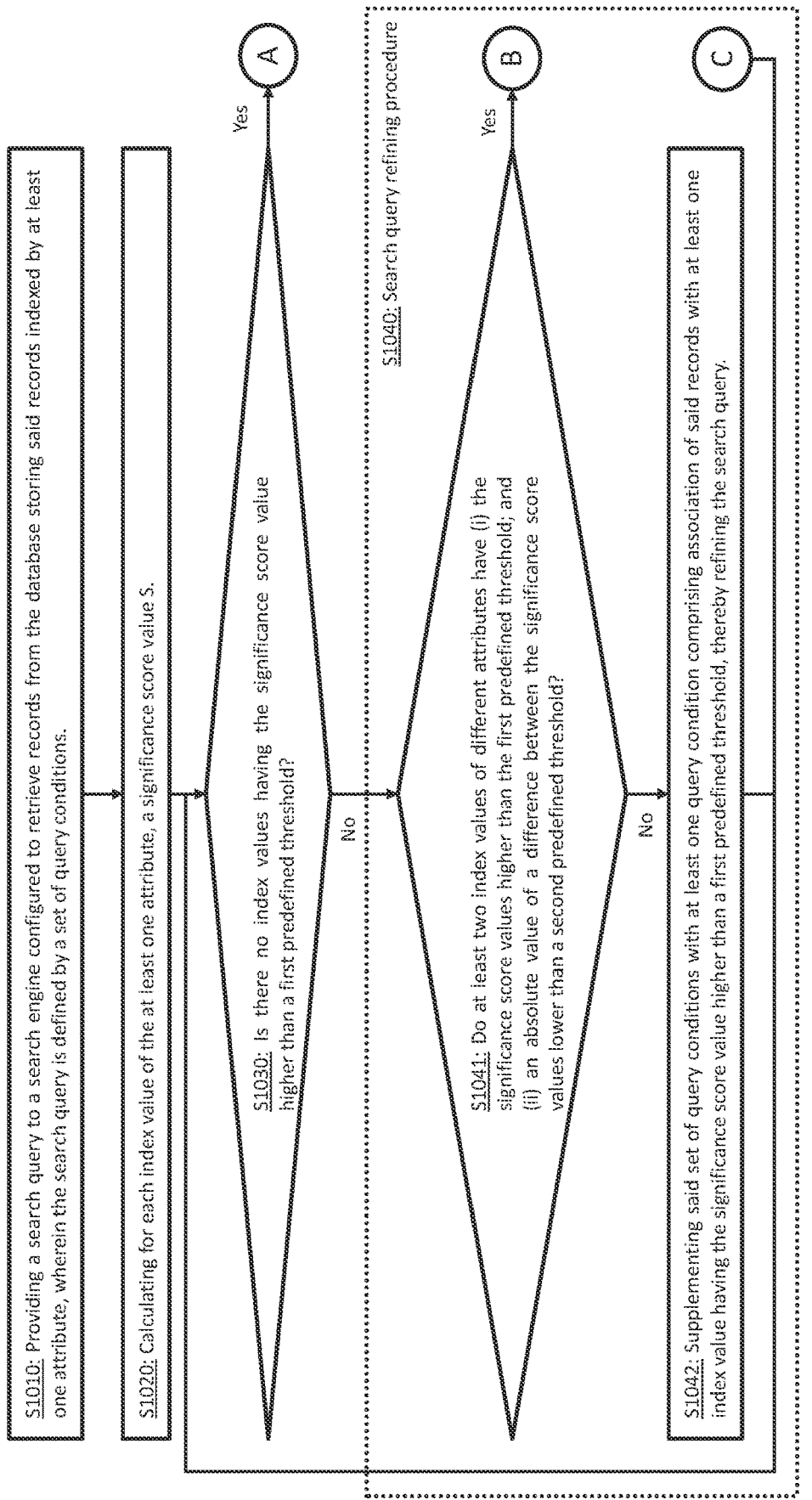
FIG. 4A is the first part of a flow diagram, depicting a method for retrieving records from a database, according to some embodiments.

Referring now to FIGS. 4A and 4B, a flow diagram is presented, depicting a method for retrieving records from a database (e.g., database 22), by at least one processor (e.g., processor 2 of FIG. 2), according to some embodiments.

As shown in step S1010, the at least one processor (e.g., such as processor 2 of FIG. 2) may provide a search query (e.g., search query 20A, as shown in FIGS. 3A and 3B) to a search engine (e.g., search engine 21, as shown in FIGS. 3A and 3B) configured to retrieve records from the database storing said records indexed by at least one attribute (e.g., records 22B stored in database 22, as shown in FIGS. 3A and 3B), wherein the search query (e.g., search query 20A, as shown in FIGS. 3A and 3B) is defined by a set of query conditions (e.g., set 20A' of query conditions, as shown in FIGS. 3A and 3B). Step S1010 may be carried out by UI module 20 and search engine 21 (as described with reference to FIGS. 3A and 3B).

As shown in step S1020, the at least one processor (e.g., such as processor 2 of FIG. 2) may calculate for each index value (e.g., index value 22A', as shown in FIGS. 3A and 3B) of the at least one attribute, a significance score value S (e.g., significance score values 21B, as shown in FIGS. 3A and 3B). Step S1020 may be carried out by search engine 21 (as described with reference to FIGS. 3A and 3B).

As shown in step S1030, the at least one processor (e.g., such as processor 2 of FIG. 2) may check whether the following break condition is satisfied: is there no index values (e.g., index values 22A', as shown in FIGS. 3A and 3B) having the significance score value (e.g., significance score values 21B, as shown in FIGS. 3A and 3B) higher than a first predefined threshold (e.g., first predefined threshold 21A, as shown in FIGS. 3A and 3B)? Step S1030 may be carried out by search engine 21 (as described with reference to FIGS. 3A and 3B).

As shown in block S1040, if the condition of step S1030 is not satisfied, the at least one processor (e.g., such as processor 2 of FIG. 2) may iteratively perform a search query refining procedure until the break condition of step S1030 is satisfied. The search query refining procedure is further described with reference to steps S1041-S1045.

As shown in step S1041, the at least one processor (e.g., such as processor 2 of FIG. 2) may check whether the following condition is satisfied: do at least two index values (e.g., index values 22A', as shown in FIGS. 3A and 3B) of different attributes have (i) the significance score values (e.g., significance score values 21B, as shown in FIGS. 3A and 3B) higher than the first predefined threshold (e.g., first predefined threshold 21A, as shown in FIGS. 3A and 3B); and (ii) an absolute value of a difference between the significance score values (e.g., significance score values 21B, as shown in FIGS. 3A and 3B) lower than a second predefined threshold (e.g., second predefined threshold 21A', as shown in FIGS. 3A and 3B)? Step S1041 may be carried out by search engine 21 (as described with reference to FIG. 3A).

As shown in step S1042, if the condition of step S1041 is not satisfied, the at least one processor (e.g., such as processor 2 of FIG. 2) may supplement said set (e.g., set 20A' of query conditions, as shown in FIGS. 3A and 3B) of query conditions with at least one query condition comprising association of said records (e.g., records 22B, as shown in FIGS. 3A and 3B) with at least one index value (e.g., index values 22A', as shown in FIGS. 3A and 3B) having the significance score value (e.g., significance score values 21B, as shown in FIGS. 3A and 3B) higher than a first predefined threshold (e.g., first predefined threshold 21A, as shown in FIGS. 3A and 3B), thereby refining the search query (e.g., search query 20A, as shown in FIGS. 3A and 3B). Step S1042 may be carried out by search engine 21 (as described with reference to FIGS. 3A and 3B).

As shown in step S1043, if the condition of step 1041 is satisfied, the at least one processor (e.g., such as processor 2 of FIG. 2) may provide, via the UI, a request to select a desired index value of said at least two index values (e.g., index values 22A', as shown in FIGS. 3A and 3B) of different attributes. Step S1043 may be carried out by search engine 21 and UI module 20 (as described with reference to FIG. 3A).

As shown in step S1044, the at least one processor (e.g., such as processor 2 of FIG. 2) may obtain, via the UI, a selection of the desired index value (e.g., index value 22A', as shown in FIGS. 3A and 3B). Step S1044 may be carried out by UI module 20 (as described with reference to FIG. 3A).

As shown in step S1045, the at least one processor (e.g., such as processor 2 of FIG. 2) may supplement said set of query conditions (e.g., set 20A' of query conditions, as shown in FIG. 3A) with at least one query condition comprising association of said records (e.g., records 22B as shown in FIGS. 3A and 3B) with the desired index value (e.g., index value 22A', as shown in FIGS. 3A and 3B). Step S1045 may be carried out by search engine 21 (as described with reference to FIG. 3A).

As shown in step S1050, if the condition of step S1030 is satisfied, the at least one processor (e.g., such as processor 2 of FIG. 2) may retrieve, by the search engine (e.g., search engine 21, as shown in FIGS. 3A and 3B), records (e.g., records 22B, as shown in FIGS. 3A and 3B) from the database (e.g., database 22 as shown in FIGS. 3A and 3B) corresponding to the refined search query (e.g., refined search query 21C as shown in FIG. 3A). Step S1050 may be carried out by search engine 21 (as described with reference to FIG. 3A).

As can be seen from the provided description, the aspects of the present invention may open new possibilities for deep and flexible data exploration and retrieval, covering a wide diversity of user's demands.

In order to further emphasize the benefits that the present invention provides, the following examples of its application are given below.

Example 1. Call center supervisor may come up with the idea to find whether there is a real case, when empathy and good handling of an agent resolved a case of customer dissatisfaction. Such an information can be used, for example, for agent training purposes.

As often applied to call center databases, transcribed call records (e.g., records 22B, as shown in FIGS. 3A and 3B) may be analyzed, using known ML-based techniques, to recognize, specific points in the agent-client dialogue, when any of the parties showed specific emotions (e.g., empathy, aggression, anger etc.). These points may then be count, and the records may be indexed by the number (or ranges) of specific emotions (e.g., the following index values may be used: "Empathy>=3 events", "Anger>=2 events" etc.).

So, e.g., the first step would be to look for call records with many empathy events, e.g., by selecting, via the UI, "Empathy>=3 events" index value. After calculation of the significance score values (same as significance score values 21B, discussed with reference to FIGS. 3A and 3B), index value lists may be sorted accordingly, and the user may see that "Agent 4" appears on top of the list having 20 call records associated with "Empathy>=3 events" index value and the significance score of 3.46. This means that Agent 4 is 3.46 times more likely to use empathy during calls than other ones, thereby representing a statistical irregularity. Such a conclusion would not be made without the approach suggested herein. So, then the supervisor may proceed further and select index value "Agent 4" to refine the search query. In result, the supervisor may see the following: there was exactly one call record that is associated with "Negative emotion events>=10 and <100", that will obviously have high significance score due to the rareness of the event (again, the supervisor would not arrive to that conclusion with regular searching tools). So, for a call center supervisor, this call recording might be very interesting.

This exploration for statistical irregularities may be performed so quickly only due to the approach suggested in the present disclosure. Otherwise, for every step of this example, the user would not know where to go to next and which index values to select.

Example 2. A call center supervisor may be interested in understanding user satisfaction with certain "Product A". The first step would be to enter a search query condition, including keyword "Product A" to be found in call records. After the request is processed, the supervisor may see, for example, that there are 9 call records with at least 5 events of "negative emotions", that is, 9 call records associated with index value "Negative emotion events>=5 and <100". The supervisor may be obviously interested to understand what causes such negative emotions to occur with respect to "Product A", in order to detect specific issues with the product and to tackle them. Hence the supervisor may further select index value "Negative emotion events>=5 and <100". After the refined request is processed, the supervisor may see, on top of the "Topics" list, index value "Delivery issue" with the highest significance score value in "Topics" attribute. In case of "Product A", the delivery is handled by a third-party delivery company. Since, due to the information that significance score represents, it is clear that this delivery issue is related either to this specific delivery company or to the "Product A" itself, since the high value of the significance score of "Delivery issue" index value shows that it is not typical for other products and for other delivery companies as well to have such delivery issues. Then, e.g., the supervisor may separately search for this delivery company in the same manner and see, that it has extremely high significance score of "Very negative emotion event" index value, hence, it may be understood that the problem is only with the delivery company, since this delivery company has issues with delivering other products as well, not only related to "Product A". After such data exploration, which, due to the benefits of the claimed invention, may be performed quickly, efficiently, and without involving any computationally complex techniques, such as ML-based clustering, the reasonable solution would be to change the delivery company.

These examples are provided for the purpose of clarity only and do not intend to limit the scope of the present invention as it is defined by the appended set of claims.

As can be seen from the provided description, the claimed invention represents a system and methods of retrieving records from an indexed database which provide an improvement of the technological field of search engines and information retrieval by making the detection and retrieval of records representing statistical irregularities in the database faster, more efficient, and less computationally complex.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of facilitating database exploration of records of a database accessed by a search engine that is interacted with via a user interface (UI) by a user for identification of irregularities in the records of the database in real time, the method comprising:

providing a search query to the search engine configured to retrieve records from the database storing said records indexed by at least one attribute, wherein the search query is defined by a set of query conditions;

iteratively performing, automatically by the search engine, a search query refining procedure until a break condition is satisfied, said search query refining procedure comprising:

(i) calculating for each index value of the at least one attribute, a significance score value S determined as:

$$S = \frac{N_{xy}/N_x}{N_y/N_t},$$

wherein $N_{xy}$ represents a number of records corresponding to said set of query conditions and associated with a respective index value, $N_x$ represents a total number of records corresponding to said set of query conditions, $N_y$ represents a total number of records associated with the respective index value, and $N_t$ represents a total number of records in the database; and (ii) supplementing said set of query conditions with at least one query condition comprising association of said records with at least one index value having the significance score value higher than a first predefined threshold, thereby refining the search query;

wherein said break condition is satisfied when, for the records corresponding to the supplemented set of query conditions, there is no index values having the significance score value higher than the first predefined threshold;

retrieving, by the search engine, records from the database corresponding to the refined search query; and displaying the records retrieved from the database to the user via the user interface.

2. The method of claim 1, wherein providing the search query to the search engine is performed via the user interface (UI).

3. The method of claim 2, further comprising providing a list of the retrieved records via the UI.

4. The method of claim 2, further comprising providing, via the UI, a list of index values of the at least one attribute;

wherein providing the search query to the search engine comprises obtaining, via the UI, selection of at least one index value from the list; and wherein said set of query conditions comprises a query condition comprising an association of said records with the selected at least one index value.

5. The method of claim 1, wherein said set of query conditions comprises at least one of: (i) a query condition indicating at least one specific keyword to be found in said records; (ii) a query condition comprising an association of said records with at least one specific index value.

6. The method of claim 1, wherein said search query refining procedure further comprises:

when at least two index values of different attributes have (i) the significance score values higher than the first predefined threshold; and (ii) an absolute value of a difference between the significance score values lower than a second predefined threshold, providing, via the user interface (UI), a request to select a desired index value of said at least two index values of different attributes;

obtaining, via the UI, a selection of the desired index value; and supplementing said set of query conditions with at least one query condition comprising association of said records with the desired index value.

7. The method of claim 6, further comprising setting at least one of the first predefined threshold and the second predefined threshold via the UI.

8. A system for facilitating database exploration of records of a database accessed by a search engine that is interacted with via a user interface (UI) by a user for identification of irregularities in the records of the database in real time, the system comprising: at least one non-transitory memory device, wherein modules of instruction code are stored, and at least one processor associated with said at least one memory device, and configured to execute the modules of instruction code, whereupon execution of said modules of instruction code, the at least one processor is configured to:

provide a search query to the search engine configured to retrieve records from the database storing said records indexed by at least one attribute, wherein the search query is defined by a set of query conditions;

iteratively perform, automatically by the search engine, a search query refining procedure until a break condition is satisfied, said search query refining procedure comprising:

(i) calculating for each index value of the at least one attribute, a significance score value S determined as:

$$S = \frac{N_{xy}/N_x}{N_y/N_t},$$

wherein $N_{xy}$ represents a number of records corresponding to said set of query conditions and associated with a respective index value, $N_x$ represents a total number of records corresponding to said set of query conditions, $N_y$ represents a total number of records associated with the respective index value, and $N_t$ represents a total number of records in the database; and (ii) supplementing said set of query conditions with at least one query condition comprising association of said records with at least one index value having the significance score value higher than a first predefined threshold, thereby refining the search query;

wherein said break condition is satisfied when, for the records corresponding to the supplemented set of query conditions, there is no index values having the significance score value higher than the first predefined threshold;

retrieve, by the search engine, records from the database corresponding to the refined search query; and display the records retrieved from the database to the user via the user interface.

9. The system of claim 8, wherein the at least one processor is further configured to provide the search query to the search engine via the user interface (UI).

10. The system of claim 9, wherein the at least one processor is further configured to provide a list of the retrieved records via the UI.

11. The system of claim 9, wherein the at least one processor is further configured to:

provide, via the UI, a list of index values of the at least one attribute; and provide the search query to the search engine by obtaining, via the UI, selection of at least one index value from the list;

wherein said set of query conditions comprises a query condition comprising an association of said records with the selected at least one index value.

12. The system of claim 8, wherein said set of query conditions comprises at least one of: (i) a query condition indicating at least one specific keyword to be found in said records; (ii) a query condition comprising an association of said records with at least one specific index value.

13. The system of claim 8, wherein said search query refining procedure further comprises:

when at least two index values of different attributes have (i) the significance score values higher than the first predefined threshold; and (ii) an absolute value of a difference between the significance score values lower than a second predefined threshold, providing, via the user interface (UI), a request to select a desired index value of said at least two index values of different attributes;

obtaining, via the UI, a selection of the desired index value; and supplementing said set of query conditions with at least one query condition comprising association of said records with the desired index value.

* * * * *